March 8, 1966 W. O. UNRUH 3,239,673
PHOTOSENSITIVE DEVICE FOR DETERMINING RELATIVE ROTATION
Filed April 30, 1963 6 Sheets-Sheet 1

INVENTOR.
WILLIS O. UNRUH
BY
ATTORNEY

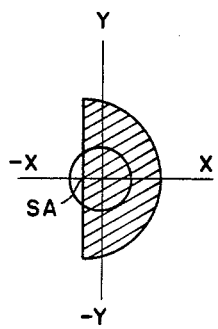
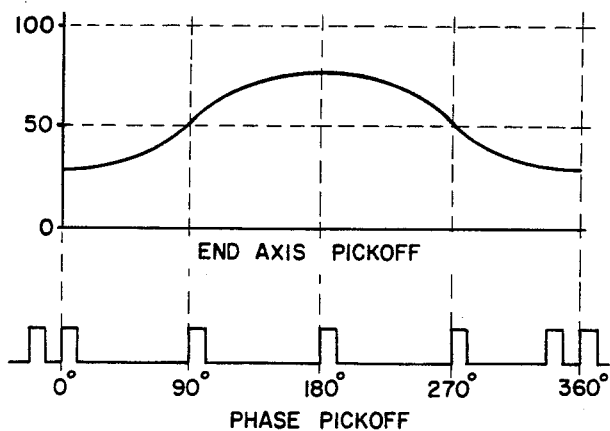
FIG. 8
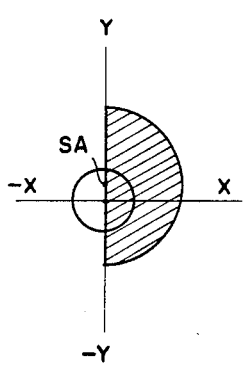
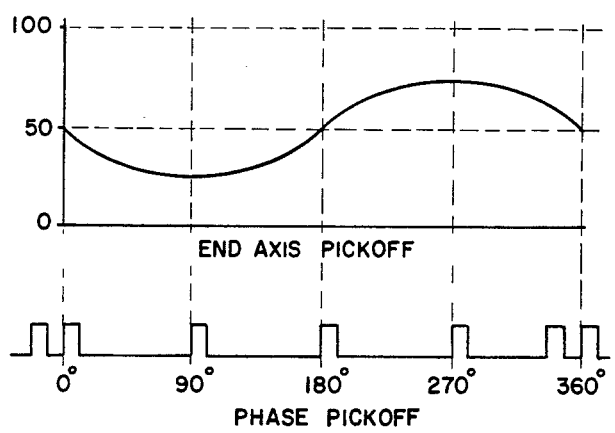
FIG. 9
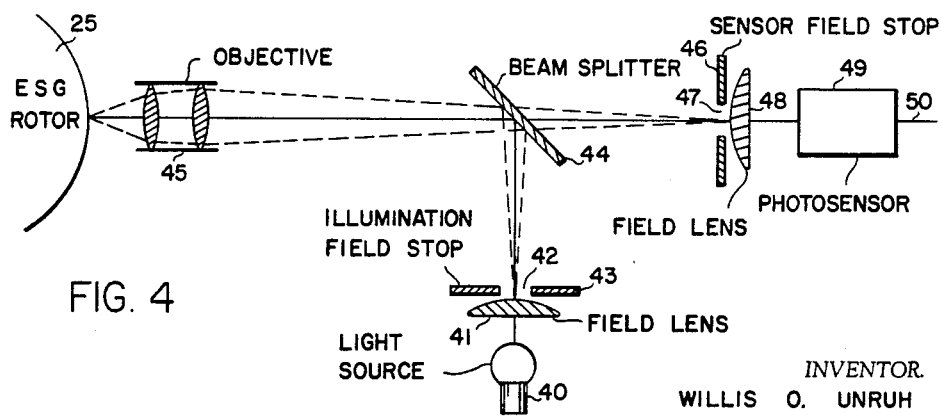
FIG. 4
INVENTOR.
WILLIS O. UNRUH
BY
ATTORNEY

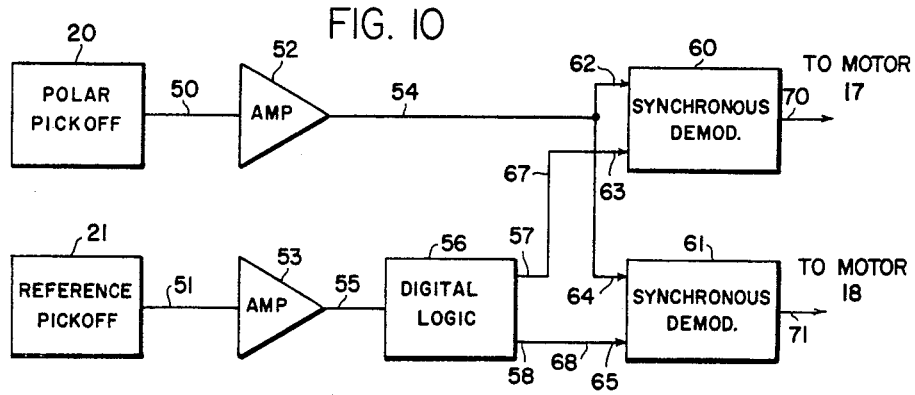
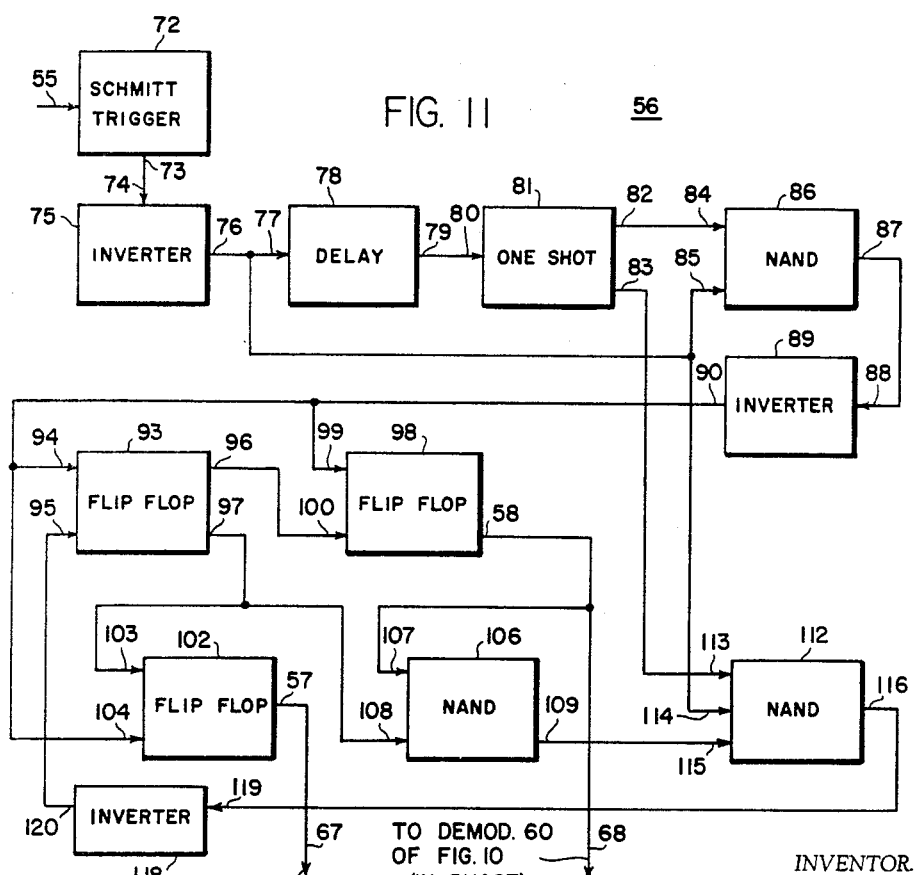

March 8, 1966 W. O. UNRUH 3,239,673
PHOTOSENSITIVE DEVICE FOR DETERMINING RELATIVE ROTATION
Filed April 30, 1963 6 Sheets-Sheet 5
12a
BALL REFERENCE
PULSE PATTERNS
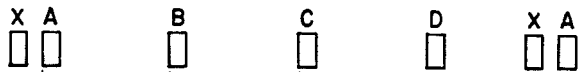
12b
SCHMITT TRIGGER 72
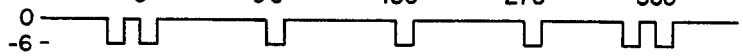
12c
INVERTER 75
12d
DELAY 78
12e
ONE SHOT 81
OUTPUT 82
12f
ONE SHOT 81
OUTPUT 83
12g
NAND 86
12h
INVERTER 89
12i
FLIP FLOP 93
OUTPUT 96
12j
FLIP FLOP 93
OUTPUT 97
12k
FLIP FLOP 98
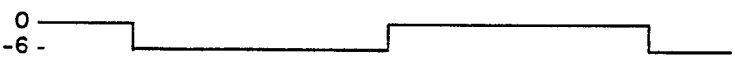
12l
FLIP FLOP 102
12m
NAND 106
12n
NAND 112
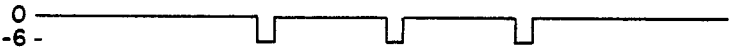
12o
INVERTER 119
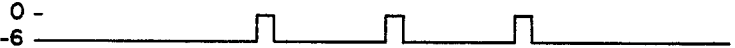
FIG. 12
INVENTOR.
WILLIS O. UNRUH
BY
Roger W. Jensen
ATTORNEY March 8, 1966 W. O. UNRUH 3,239,673
PHOTOSENSITIVE DEVICE FOR DETERMINING RELATIVE ROTATION
Filed April 30, 1963 6 Sheets-Sheet 6

INVENTOR.
WILLIS O. UNRUH
BY
Roger W. Jensen
ATTORNEY

United States Patent Office 3,239,673
Patented Mar. 8, 1966

3,239,673
PHOTOSENSITIVE DEVICE FOR DETERMINING
RELATIVE ROTATION
Willis O. Unruh, Clearwater, Fla., assignor to Honeywell
Inc., a corporation of Delaware
Filed Apr. 30, 1963, Ser. No. 276,737
14 Claims. (Cl. 250—203)

The present invention provides a means for accurately determining the relative rotation between a support mechanism and the rotating member of an inertial instrument. The invention is especially well adapted to inertial instruments in which the inertial member is supported universally for rotation by means of support fields. In the preferred embodiment of this invention, the inertial member is a sphere. It will be understood, however, that the invention is equally applicable where the inertial member has a nonspherical configuration. The field producing means form an envelope surrounding the inertial member and support the member by means of said fields free of physical contact with the support. The invention here disclosed is further most applicable to the gimbal mode of inertial instruments as distinguished from the strap down mode. It the gimbal mode the envelope is supported on a pair of mutually perpendicular gimbals equipped with motors to servo the envelope in the desired relationship to the inertial member. The signals for these motors are obtained from pickoff means which are able to provide information of the relative displacement between the inertial mass and the supporting envelope. The pickoffs are mounted on the envelope and rotate with the envelope.

It is usually desired to maintain the inertial member and the envelope in such a relation that the spin axis of the rotating member if extended in a straight line through the envelope would at all times intersect the envelope at the same two points. The function of the pickoffs viewing the inertial member in the gimbal mode is, therefore, to provide signals indicative of the displacement of the envelope with respect to the member and allow the use of these signals to energize means to rotate the gimbals on which the envelope is attached and keep the envelope in substantially constant relationship with the inertial member.

By maintaining the envelope slaved to the rotor, the envelope is effectively isolated from the carrying vehicle and the inertial reference can be obtained by measuring the rotation angles between the envelope and the rigid structure bearing the envelope supporting gimbals. The field supported inertial instrument in the gimbal mode, therefore, behaves just as any prior art inertial instrument and the information from it can be obtained in the same manner. The significant difference is that in the field supported instrument the envelope, which is supported in the same manner as the inertial mass providing the inertial reference in a conventional gyro, is not the primary source of the inertial reference information, but obtains its information from an inertial member universally supported within the envelope in a relatively frictionless environment and having better than the prior art symmetry. This is made possible by elimination of mechanical bearings, allowing the instrument to exhibit a greatly increased accuracy and longer lifetime.

Of the most critical nature, therefore, is the problem of transferring accurately the inertial reference information from the inertial member to the supporting envelope. In other words, the problem is to slave the envelope to the rotor without in the process of doing this in any way affecting the behavior of the inertial mass. It is consequently not allowable to use for this purpose the mechanical or field torques produced by the spinning inertial member as is the teaching of some prior art arrangements, since that would necessarily affect the angular momentum of the member and/or cause gyroscopic drifting and accordingly introduce serious errors.

The present invention provides for this by a pattern at a pole on the rotating sphere and an optical pick off ideally centered on the spin axis viewing the pattern on said pole. The pattern is comprised of two contrasting surfaces adjacent to each other along at least a portion of a great circle intersecting the spin axis. The pattern is comprised of a semicircular contrasting surface with its straight edge centered on the spin axis. The pattern, therefore, has a D shape and is for convenience referred to as the D pattern. This pickoff arrangement is of the so-called null sensor type in that when the pickoff is centered exactly on the spin axis, the output of the pickoff will be a nonvarying D.C. signal. As the pickoff moves off the rotor pole due to some external disturbance, the output will be a time varying signal with a frequency equal to the spin frequency of the rotor and the magnitude proportional to the amount of displacement off the axis.

The output of the end axis pickoff will be of the same magnitude for equal displacement of the pickoff off the null position in any direction, but will differ in phase with respect to a reference signal. The phase angle will vary between zero and 360° corresponding to the locus of the possible pickoff off null positions. To determine the direction of the off null position displacement it is, therefore, necessary to provide some kind of phase reference against which the end axis pickoff signal can be compared. It will be understood that there are many ways a reference signal can be obtained and the specific embodiment shown in this application is not intended to be a limitation, but merely an example to facilitate the teaching of this invention.

It is, therefore, the object of this invention to provide an improved inertial instrument.

A further object of this invention is to provide a means for accurately measuring the relative rotation between an inertial member and its support in a gimbal mode of a field supported inertial instrument.

These and other objects of the invention will be more clearly understood upon examination of the following specification and claims, in conjunction with the drawings in which:

FIGURE 4 shows a possible arrangement of the pickoff optics to be used with this invention;

FIGURE 8 illustrates the phase relationship between the end axis pickoff output signal and the output signal of the reference pickoff for a plus Y displacement of the spin axis;

FIGURE 9 illustrates the phase relationship between the end axis pickoff output signal and the output signal of the reference pickoff for a plus Y displacement of the spin axis;

FIGURE 10 is a block diagram of the control electronics adapted to convert the pickoff signals into gimbal rotation;

FIGURE 11 shows a block diagram of a logic suitable for use in the control circuit of FIGURE 10 for processing the pickoff signals;

FIGURE 12 shows the waveforms of the signals appearing at various points of the logic shown in FIGURE 11;

Figure 1:
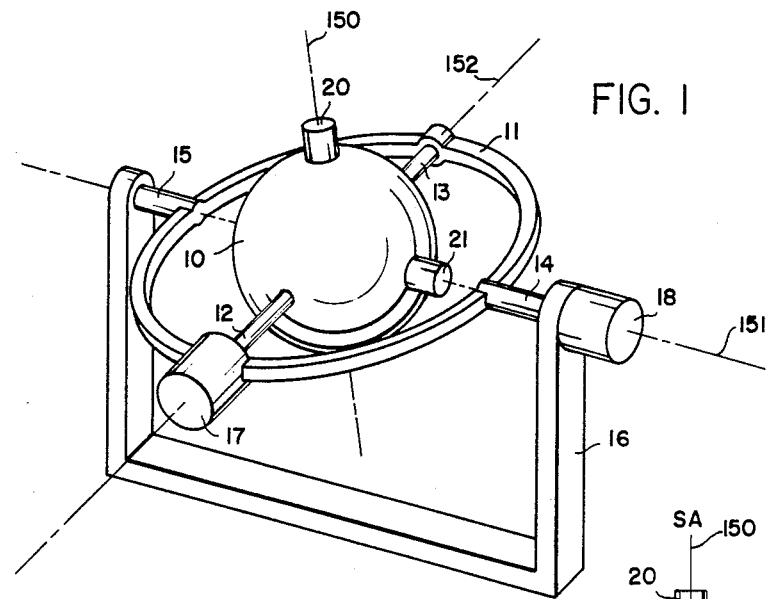
FIGURE 1 is an isometric drawing of a gimballed mode of an electrostatic gyro in which the present invention finds best application.

Referring to FIGURE 1, envelope 10 is supported for rotation about an axis 152 on gimbal 11 by shafts 12 and 13. Gimbal 11 is in turn supported for rotation about an axis 151 in 90° phase relationship to the rotational axis 152 of the envelope 10 on a support 16 by means of shafts 14 and 15. A motor 17 is mounted on gimbal 11 in operative engagement with shaft 12, which is rigidly connected to envelope 10, to allow rotation of envelope 10 when motor 17 is energized by an error signal. A motor 18 is mounted on support 16 in operative engagement with shaft 14 which is rigidly attached to gimbal 11 to allow rotation of gimbal 11 when motor 18 is energized by an error signal. Envelope 10 contains an inertial mass and supports pickoffs 20 and 21 which provide the error signals to energize motors 17 and 18 when an error exists between the relative orientation of envelope 10 and inertial member within the envelope. This is better illustrated by FIGURE 2, which shows a cutaway view of envelope 10 exposing a spherical inertial member 25.

Figure 2:
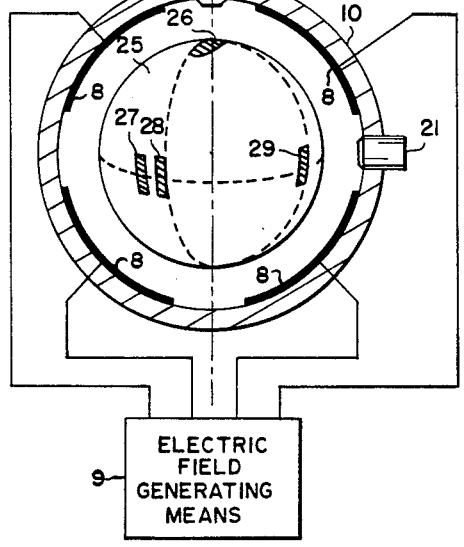
FIGURE 2 is a cutaway view of a portion of FIGURE 1, exposing the inertial member.

FIGURE 2 further illustrates the important features of the invention which lie in the pattern on the inertial member 25 in combination with pickoffs 20 and 21. The pattern consists of a contrasting surface 26 in the shape of a D at a pole of the inertial member 25. The straight line of the D shaped pattern is centered on the spin axis 150 of rotor 25. Pickoff 20 is adapted to observe the pole region of the inertial member 25, the center of the pickoff field of view being superimposed exactly on spin axis 150 of inertial member 25 when no error exists. A pattern around the equator is comprised of four phase marks 28, 29, 30 and 31 positioned at 90° intervals and a reference mark 27 located adjacent to phase mark 28 to identify the zero degree phase mark. The entire pattern comprised of the D spot and the phase marks is more clearly shown in FIGURE 3, which shows a view of spherical inertial member 25 looking along spin axis 150.

FIGURE 4 shows a schematic representation of a pickoff means 20 or 21 shown in FIGURES 1 and 2. Light from a light source 40 is collected by a field lens 41 and the collected light passes through an aperture 42 in an illumination field stop 43. The light is reflected by a beam splitter 44 and is directed through objective lens 45 to illuminate a portion of rotor 25. Beam splitter 44 has a semireflecting surface such as a half-silvered mirror. Some of the light reaching the inertial member 25 is reflected back through objective lens 45 and a portion of this reflected light is allowed to pass through beam splitter 44 and is directed by sensor field stop 46 through a field lens 48 to a photo sensor 49 having an output 50. The output signal of photo sensor 49 appearing at output 50 is a signal proportional to the amount of light reflected from rotor 25.

In FIGURE 10, pickoff 20, corresponding to the polar pickoff in FIGURES 1 and 2, has its output connected to an input of amplifier 52 by means of a conductor 50. Amplifier 52 has its output connected to an input terminal 62 of a synchronous demodulator 60 and an input terminal 64 of a synchronous demodulator 61. Synchronous demodulator 60 further has an input terminal 63 and an output 70. A pickoff 21 which corresponds to the equatorial pickoff of FIGURES 1 and 2 has an output 51 connected to an input of an amplifier 53. Amplifier 53 has an output 55 connected to an input of a digital logic 56. Digital logic 56 further has outputs 57 and 58. Synchronous demodulator 61 also has an input terminal 65 and an output 71. The output terminal 57 of digital logic 56 is connected to the input terminal 63 of synchronous demodulator 60 by means of a conductor 67 and the output terminal 58 of digital logic 56 is connected to input terminal 65 of synchronous demodulator 61 by means of a conductor 68.

FIGURE 11 shows in more detail the digital logic 56 of FIGURE 10. Input 55 of digital logic 56 is the input of a Schmitt trigger 72 which also has an output 73. Output 73 of Schmitt trigger 72 is connected to an input 74 of an inverter 75. Inverter 75 has an output 76 connected in parallel to input 77 of delay 78, input 85 of a nand circuit 86 and input 114 of a nand circuit 112. The delay 78 has an output 79, nand circuit 86 has a further input terminal 84 and an output 87, and nand circuit 112 has additional input terminals 113 and 115 and an output 116. Output 79 of delay 78 is connected to an input 80 of a one-shot 81. One-shot 81 further has an output terminal 82 connected to the input terminal 84 of a nand circuit 86 and an output terminal 83 connected to the input 113 of nand circuit 112. The output 87 of nand circuit 86 is connected to an input 88 of an inverter 89. Inverter 89 further has an output 90 connected in parallel to input 99 of flip-flop 98, an input 94 of a flip-flop 93, and an input 104 of a flip-flop 102. Flip-flop 98 further has an input 100 and an output 58, flip-flop 93 has an additional input 95 and outputs 96 and 97, and flip-flop 102 has a further input 104 and an output 57. The output 96 of flip-flop 93 is connected to the input 100 of flip-flop 98. The output 58 of flip-flop 98 is connected to an input 107 of a nand circuit 106 and also provides an inphase output of the digital logic 56 which referring back to FIGURE 10 is connected by means of a conductor 68 to a synchronous demodulator 61. Nand circuit 106 further has an input 108 and an output 109. Output 97 of flip-flop 93 is connected in parallel to input 103 of flip-flop 102 and input 108 of nand circuit 106. Output 57 of flip-flop 102 provides a second output of digital logic 56 and referring back to FIGURE 10 is connected by means of a conductor 67 to input terminal 63 of synchronous demodulator 60. The output 109 of nand circuit 106 is connected to input 115 of nand circuit 112, while output 83 of one-shot 81 is connected to input 113 of nand circuit 112. Output 116 of nand circuit 112 is connected to an input 119 of an inverter 118. Inverter 118 further has an output 120 connected to input 95 of flip-flop 93.

It should be noted here that all logic blocks shown in FIGURE 11 and elsewhere in this application can be standard, prior-art devices such as can be found in The Handbook of Selected Semiconductor Circuits, prepared by Transistor Applications Inc. for Bureau of Ships, Department of the Navy, under contract number NObsr 73231.

Figure 13:
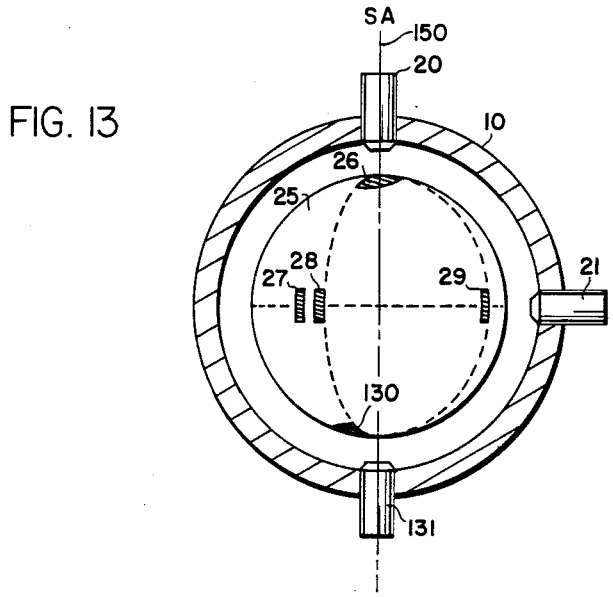
FIGURE 13 shows a rotor and an envelope with two end axis pickoffs and one reference pickoff.

FIGURE 13 is very similar to FIGURE 2, the only difference being an additional D pattern 130 positioned at a pole exactly opposite D pattern 26. D pattern 130 is placed 180° out of phase with pattern 26 so that the two patterns lie on the opposite sides of a great circle joining the straight edges of the two D patterns. A pickoff 131 is also added, positioned diametrically opposite to pickoff 20.

By adding an additional D pattern 130 it is possible to get more accurate information about the gyro attitude and in addition information is provided about lateral displacement of the inertial member 25 with respect to the envelope, normal to the spin axis 150.

Figure 14:
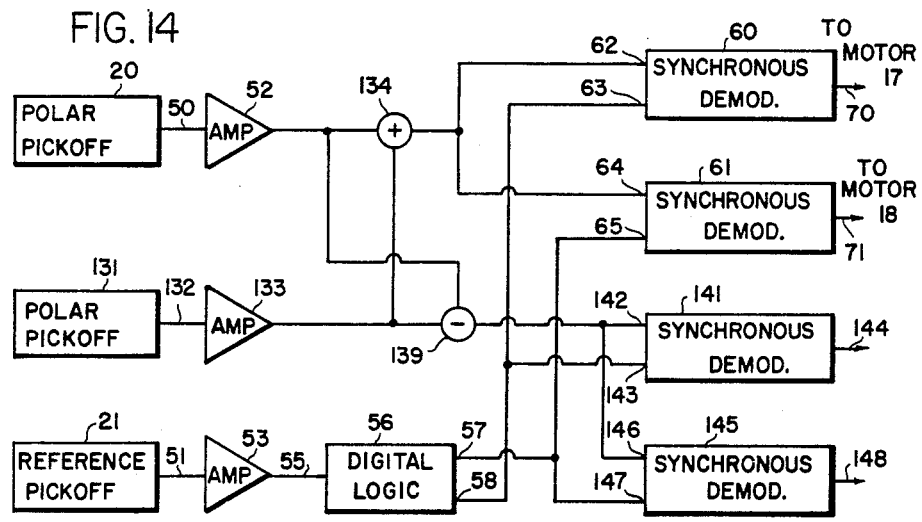
FIGURE 14 shows a block diagram for processing the pickoff outputs of FIGURE 13.

FIGURE 14 is similar to FIGURE 10, with additional hardware to utilize the signal from pickoff 131 and provide the signals for both the lateral and the rotational errors. Pickoff 20 has its output connected to an input of amplifier 52 by means of a conductor 50. The output of amplifier 52 is fed to a summer 134 and a subtracter 139. Pickoff 131 has an output 132 connected to an input of an amplifier 133. The output from amplifier 133 is connected in parallel to a summer 134 and a subtracter 139. The output of summer 134 which is the sum of the outputs from amplifiers 52 and 133 is fed in parallel to an input 62 of synchronous demodulator 60 and an input 64 of a synchronous demodulator 61. Synchronous demodulator 60 further has an input 63 and an output 70 and synchronous demodulator 61 has in addition an input 65 and an output 71. This output from the subtracter 139 which is the difference between the output of amplifiers 52 and 133 is fed in parallel to an input 142 of a synchronous demodulator 141 and an input 146 of a synchronous demodulator 145. Synchronous demodulator 141 further has an input 143 and an output 144 and synchronous demodulator 145 also has an input 147 and an output 148. A reference pickoff 21 has an output 51 connected to an input of amplifier 53. The output of amplifier 53 is connected to a digital logic circuit 56 by means of a conductor 55. Digital logic 56 is shown in detail in FIGURE 11. Digital logic 56 further has outputs 57 and 58. Output 57 is connected to input 65 of synchronous demodulator 61 and to input 147 of synchronous demodulator 145. Output 58 of digital logic 56 is connected to input 63 of synchronous demodulator 60 and to input 147 of synchronous demodulator 145.

*Operation*

In FIGURE 1 inertial member 25, shown exposed in FIGURE 2, is supported by means of electric or other fields within envelope 10. The spherical inertial member 25 possesses a pattern, as explained before, and in combination with pickoffs 20 and 21 provides attitude information of the inertial member. The output signal of pickoffs 20 and 21 are proportional to the amount of reflected light from the rotor and are therefore functions of the rotor pattern. Pickoff 20 is adapted to observe the D pattern on the pole of the rotor and will be referred to as an end axis pickoff. Pickoff 21, on the other hand, is adapted to observe the phase reference pattern on the rotor equator and will be referred to as a phase reference pickoff. It is intentionally not referred to as an equatorial pickoff because the reference pattern is not limited to the equatorial position but could be placed on any other portion of the inertial member.

In the optical pickoff shown in FIGURE 4, a light source 40 provides for the illumination of the rotor 25. The light from the light source 40 is directed through an illumination field stop 43 by a field lens 41 and is reflected by a beam splitter 44 through an objective lens 45 onto the rotor 25. The reflected light from rotor 25 is directed through the same objective lens 45 and is at least partially allowed to pass through beam splitter 44 and the field lens 48 to a photo sensor 49 which converts the light energy into an electrical signal appearing at output 50. Beam splitter 44 has a semitransparent and semireflective quality so as to allow a portion of the light to be reflected and a portion to be transmitted through.

Figure 5A:
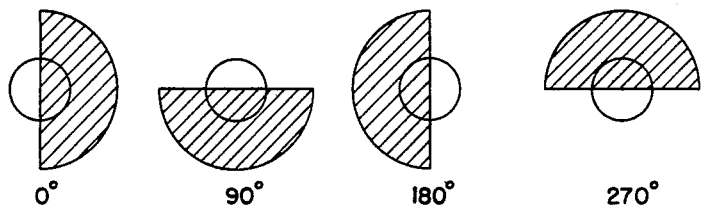
FIGURE 5A illustrates the relationship of the pickoff field of view with the D pattern on the rotor when the rotor spin axis is correctly positioned in relation to the envelope.
Figure 5B:
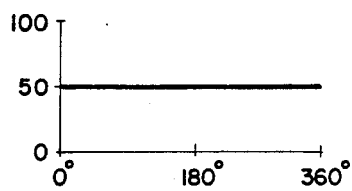
FIGURE 5B shows the output signal of the end axis pickoff for the situation of FIGURE 5A.
Figure 6A:
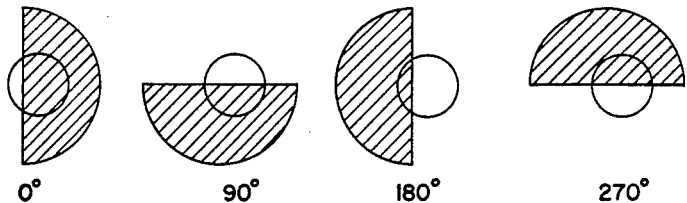
FIGURE 6A illustrates the relationship of the pickoff field of view with the D pattern on the rotor when the spin axis is displaced from the center of the pickoff field of view by an amount less than the radius pickoff field of view.
Figure 6B:
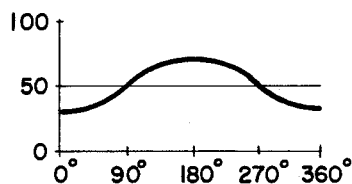
FIGURE 6B shows the output signal of the end axis pickoff for the situation of FIGURE 6A.
Figure 7A:
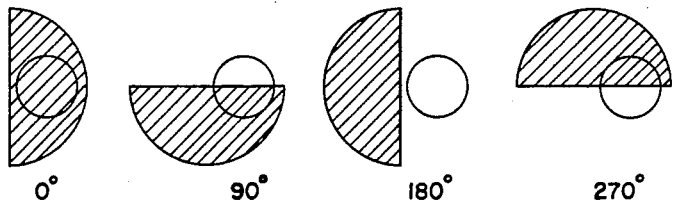
FIGURE 7A illustrates the relationship of the pickoff field of view with the D pattern on the rotor when the spin axis is displaced from the center of the pickoff field of view by an amount more than the radius of the pickoff field of view.
Figure 7B:
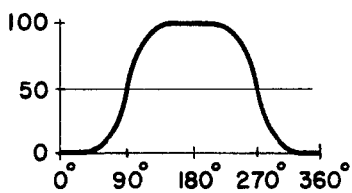
FIGURE 7B shows the output signal of the end axis pickoff for the situation of FIGURE 7A.

Since the magnitude of the output signal of an optical pickoff such as explained with reference to FIGURE 4 is directly proportional to the amount of reflected light observed, it can be seen that the end axis pickoff 20 looking at the pole region of the inertial member and the D pattern will have a constant output when the pickoff field of view is centered exactly on spin axis 150. This is shown in FIGURES 5A and 5B. If spin axis 150 and the center of the pickoff field of view are not in exact register, however, the amount of reflected light observed by pickoff 20 will vary as a function of the rotor rotation. During each revolution of the rotor the pickoff will observe a maximum and a minimum amount of radiation which will vary approximately sinusoidally about an average value equal to the output when spin axis 150 and the center of the pickoff field of view are in exact register as shown in FIGURE 5. The situation when the pickoff field of view is displaced from the spin axis by an amount less than the radius of the pickoff field of view is shown in FIGURES 6A and 6B. When the displacement between spin axis 150 and the center of the pickoff field of view is greater than the radius of the pickoff field of view, the output of the pickoff is no longer a sinusoidal function, since the pickoff field of view passes for extended periods through regions where it observes only the more reflective or the less reflective surface. The output signal will therefore contain a flattened portion at its maximum and its minimum.

It should be understood that other than optical means could be employed in detecting a pattern on the inertial member. The pattern, for example, could be comprised of radioactive and nonradioactive surfaces and the optical pickoffs replaced by radiation sensors appropriate for the type of signal available from the rotor. The specific arrangement shown in the application is for illustration purposes only.

FIGURES 8 and 9 show the relation between the end axis pickoff output signal and the output signal of the reference pickoff 21. It illustrates how the phase of the end axis signal varies as a function of the direction angle of the spin axis displacement with the pickoff field of view. If for a minus X displacement, as shown in FIGURE 8, the phase relationship is as indicated, then a plus Y displacement in FIGURE 9 will provide a signal whose phase will trail the similar signal for a minus X displacement by 90°. For a plus X displacement the signal would trail, or lead, the relative phase of the minus X output by 180°. Similarly, the relative phase of the end axis pickoff signal for a minus Y displacement of the spin axis would be plus 90°. It is therefore possible by comparing the signals from end axis pickoff 20 with the signals from reference pickoff 21 to determine the direction of the off null displacement.

The output signal of the polar pickoff 20 in FIGURE 10 appearing at the output 50 is a time varying signal whose frequency is equal to the spin frequency of the inertial member 25 discussed in reference with FIGURE 1, and its magnitude is proportional to the amount of error in the spin axis position. The signal from pickoff 20 is amplified by amplifier 52 and fed into synchronous demodulators 60 and 61 at inputs 62 and 64 respectively. The reference pickoff, also called phase pickoff, has an output signal such as shown in FIGURES 8 and 9 and further discussed in more detail with reference to FIGURE 12. The output signal from pickoff 21 is fed into amplifier 53 where it is amplified and subsequently directed to a digital logic 56. Digital logic 56 operates on the amplifier reference signal to provide a square wave output whose frequency is equal to the frequency of the output signal appearing at the polar pickoff 20. The two signals appearing at outputs 57 and 58 of digital logic 56 are identical except that the signal at output 57 leads the signal at output 58 by 90°. If we therefore arbitrarily refer to the signal appearing at output 58 as an inphase signal, then the signal appearing at output 57 is in quadrature. The inphase signal from output 58 of logic 56 is fed into synchronous demodulator 61 at input 65 and the quadrature signal from output 57 of logic 56 is fed into synchronous demodulator 60 at input 63. Clearly the output signal of synchronous demodulator 61 appearing at output 71 is indicative of the amplitude of the error caused by the rotation of the spin axis or the envelope 10 about a particular axis running through the center of the inertial member in the equatorial plane of the inertial member. The output signal of synchronous demodulator 60 then is proportional to the magnitude of rotational error about an axis in the equatorial plane of the rotor but perpendicular to the axis the rotational error about which appears at the output of synchronous demodulator 61.

It will be noted that the axes of rotation 151 and 152 of gimbal 11 and envelope 10 respectively are a pair of mutually perpendicular axes lying in the plane substantially coincident with the equatorial plane of the inertial member 25. If, therefore, the phase reference is adjusted in such a way that the output of synchronous demodulator 61 exhibits an error signal proportional to the rotational error about an axis substantially coincident with axis 151 about which gimbal 11 is allowed to rotate, then the output signal of the synchronous demodulator 60 will be indicative of the rotational error about an axis perpendicular to said axis of gimbal 11 and will be substantially coincident with axis 152 of the envelope rotation on shafts 12 and 13. To maintain envelope 10 and inertial member 25 in constant register, the error signal from synchronous demodulator 61 may be applied to motor 18 for rotational correction about axis 151 of gimbal 11 and the error signal from synchronous demodulator 60 may be applied to motor 17 for correction about axis 152 of envelope rotation with respect to gimbal 11.

The relative angular orientation of the error signal and gimbal axes are normally orthogonal as described in the disclosure; however, the technique is not necessarily restricted to orthogonal axes. In part, error signals corresponding to other than orthogonal axes can be obtained by suitable phase shifting of one of the reference waveforms into the demodulator.

In FIGURE 11, Schmitt trigger 72 receives its input signal from amplifier 53 at its input 55 and provides an output signal at its output 73. The function of Schmitt trigger 72 is to provide an output which is comprised of a series of square pulses of substantially equal magnitude and time duration. The signal from the output of Schmitt trigger 72 is fed into inverter 75 at input 74. The signal appearing at output 76 of inverter 75 is a simply inverted signal received from the Schmitt trigger 72. From output 76 of inverter 74 the signal is channeled into delay 78 at input 77, nand circuit 76 at input 85, and nand circuit 112 at input 114. The purpose of delay circuit 78 is to provide an output which is identical to its input except that it is delayed in time. The amount of the delay must be slightly greater than the width of one input pulse. The operation of FIGURE 11 can be best understood by referring to FIGURE 12, which illustrates the waveforms of the signals appearing at various points of the logic shown in FIGURE 11. The output of Schmitt trigger 72 is shown in FIGURE 12b, the output signal of inverter 75 is shown in FIGURE 12c, and the output signal of delay 78 is shown in FIGURE 12d.

Figure 3:
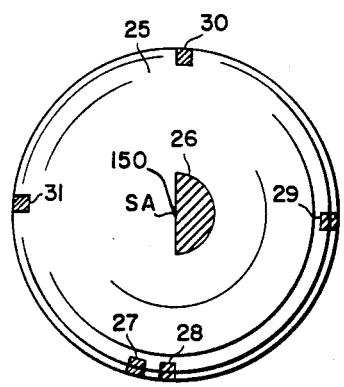
FIGURE 3 is a view of the inertial member of FIGURE 2, looking along the spin axis at the D spot pattern.

To facilitate in discussing the operation of the logic circuit 56, in FIGURE 11, on the signal received from reference pickoff 21, the phase reference marks 27, 28, 29, 30 and 31, shown in FIGURE 3 and also depicted in FIGURE 12a, are referred to by letters X, A, B, C and D respectively.

The signal appearing at output 79 of delay 78 is applied at input 80 of one-shot 81. The purpose of one-shot 81 is to provide an output pulse whose width is at least slightly greater than the total time required by the X and A pulse group. One-shot 81 provides two outputs, each ideally inverse of the other, appearing at outputs 82 and 83. These signals are illustrated in FIGURES 12e and 12f respectively. The signal appearing at output 82 of one-shot 81 is fed into nand circuit 86 at input 84 and the output signal appearing at output 83 of one-shot 81 is applied to input 113 of nand circuit 112. Nand circuit 86 provides an output signal only when the two input signals are in time coincident. It can be seen from FIGURE 12g that the output signal of nand circuit 86 consists only of the A pulses. This signal is fed into converter 89 where it is simply inverted and routed to reset inputs of flip-flops 93, 98, and 102. More specifically, the signal from inverter 89 is fed into flip-flop 93 at its input 94, into flip-flop 98 at input 99, and flip-flop 102 at its input 104. It will be observed that the circuit action thus far has been such as to cause the A pulses to be singled out and thus provide a single pulse per inertial member resolution. Receipt of the reset pulse flip-flops 93 and 98 and 102 from inverter 89 causes all of these flip-flops to be reset. The flip-flops are thus placed in a common, known state at the "start" reference time of each revolution of the inertial member. Flip-flop 93 has two complementary outputs appearing at outputs 96 and 97. The signal appearing at output 96 of flip-flop 93 is directed to input 100 of flip-flop 98, while the signal appearing at output 97 of flip-flop 93 is fed into input 103 of flip-flop 102 and input 108 of nand circuit 106. The output signal of flip-flop 98 appearing at output 58 is directed to input 107 of nand circuit 106. The output signal of flip-flop 98 also provides the inphase reference signal which is, referring back to FIGURE 10, fed into synchronous demodulator 61 at its input 65.

Immediately after the reset signal is received by flip-flops 93 and 98 from inverter 89, they are put into a "start" position and the signals appearing at terminal 96 of flip-flop 93 and output 58 of flip-flop 98 are in a down level. The waveforms of these signals are shown in FIGURES 12j and 12k respectively. The output signal of the nand circuit 106 which receives its two input signals from output 97 of flip-flop 93 and output 58 of flip-flop 98 is in an up level state since both inputs are in a down level state. As is known to those skilled in the art, the output signal of a nand circuit is always in an up state except when the input signals are all in an up state at which time the level of the output signal changes to a down state. Flip-flop 93 will change its state upon each receipt of a positive going pulse from the inverter 118. It will be shown that this type of pulse occurs at the output of the inverter 118 only at the time of the B and C pulses and at the beginning of the D pulse. The signal appearing at output 97 of flip-flop 93 is illustrated in FIGURE 12j, the signal appearing at output 58 of flip-flop 98 is shown in FIGURE 12k, and the signal at the output of nand circuit 106 is shown in FIGURE 12m. The signal produced at the output 109 of nand circuit 106 is fed into nand circuit 112 at its input 115. The signal appearing at output 116 of nand circuit 112 is illustrated in FIGURE 12n. This signal is inverted by inverter 118 and fed into flip-flop 93 at input 95. Referring to FIGURE 12o, which shows the output signal of inverter 118, it can be seen that flip-flop 93 will change its state at the time of the B, C and D pulses. This is illustrated by FIGURES 12i and 12j which illustrate the signals appearing at outputs 96 and 97 of flip-flop 93.

Flip-flop 98 will change its state every time it receives a positive going signal at its input 100 from output 96 of flip-flop 93. This happens at the beginning of the A and C pulses as shown in FIGURE 12k. This output provides synchronous demodulator 61 of FIGURE 10 with an inphase reference signal.

Flip-flop 102 changes its state when it receives a positive going signal at its input from the output 97 of flip-flop 93. By referring to FIGURE 12j it is seen that this occurs at the beginning of pulses B and D. The output signal of flip-flop 102 is therefore as shown in FIGURE 12l, providing a quadrature reference signal from synchronous demodulator 60 of FIGURE 10.

In FIGURE 13 an additional output signal is available from pickoff 131 looking at the D pattern 130. The output signals from pickoffs 20, 21 and 131 together are able to provide information regarding the rotational displacement of inertial member 35 about any axis through the equatorial plane, and are also able to provide information regarding the translation of inertial member 25 normal to the spin axis. How these signals may be used to provide the desired information is shown with reference to FIGURE 14. In FIGURE 14, the output signal from pickoff 20 is amplified by amplifier 52 and the output signal from pickoff 131 is amplified by amplifier 133. The signals from amplifiers 52 and 133 are added in summer 134 and this sum is fed into synchronous demodulator 60 at input 62 and synchronous demodulator 61 at its input 64. The signals from amplifiers 52 and 133 are also fed into subtractor 139 and the difference is fed into synchronous demodulator 141 at input 142 and synchronous demodulator 145 at input 146. Referring back to FIGURE 13, it will be seen that since the D patterns positioned at the opposite extremes of the spin axis are on the opposite sides of a great circle, any purely rotational movement of the inertial member with respect to envelope 10 will induce substantially equal signals in pickoffs 20 and 131. These signals will be of the same phase. On the other hand, any purely translational movement of inertial member 25 in a direction normal to the spin axis will induce signals in pickoffs 20 and 131 which will be of a subtsantially equal magnitude but of opposite sense. That is, the phase relationship of the two output signals will be 180°. It follows then that for a purely rotational movement of inertial member 25 the sum of the signals from pickoff 20 and pickoff 131 will provide rotation information. It also follows that for a purely rotational movement of inertial member 25 the sum of the signals from pickoffs 20 and 21 would be approximately twice as large as the output of each pickoff by itself and the difference between these two signals will be substantially zero. For a purely translational movement of inertial member 25, however, the inverse is true. The sum of the signals from pickoffs 20 and 131 will be substantially zero, and the difference between the two signals will be approximately equal to twice the magnitude of the signal from each pickoff. By adding the signals from pickoffs 20 and 131 the rotational error signal is therefore isolated from the translational signal and the resultant sum is a function of rotational error only. By taking the difference of the signals from pickoffs 20 and 131, the translational error signal is isolated from the rotational error signal and the resulting signal is a function of translational error only. By demodulating the sum and the difference signals obtained by taking the sum and the difference of signals from pickoffs 20 and 131, with respect to the phase reference signals obtained from pickoff 21 observing the equatorial pattern in FIGURE 13, it is therefore possible to obtain information about the magnitude and direction of the translational or rotational movements of inertial member 25. The electronics of FIGURE 14 accomplish these objectives essentially in the manner described below.

The output signal of reference pickoff 21 is amplified by amplifier 53 and directed to a logic 56 providing an inphase reference signal at its output 58 and a quadrature reference signal at its output 57. The operation of digital logic 56 is described in detail with reference to FIGURE 11. The inphase signal from output 58 of digital logic 56 is fed into input 63 of synchronous demodulator 60 and input 143 of synchronous demodulator 141, while the quadrature reference signal from output 57 of digital logic 56 is directed to input 65 of synchronous demodulator 61 and input 147 of synchronous demodulator 145. The significance of the output signals appearing at output 70 of synchronous demodulator 60 and output 71 of synchronous demodulator 61 have been explained with reference to FIGURE 11.

The output signals of synchronous demodulator 141 and synchronous demodulator 145 in combination provide information about the translational motion of the spin axis of inertial member 25. The output signal of synchronous demodulator 141 is indicative of translational motion of spin axis 150 of inertial member 25 in a plane which includes spin axis 150 of inertial member 25 and the rotational axis 151 of gimbal 11. The signal appearing at output 148 of synchronous demodulator 145 is indicative of translational motion of spin axis 150 in a plane including spin axis 150 and the rotational axis 152 of envelope 10 with respect to gimbal 11.

Although the specific embodiment of the present invention shown in the drawings and discussed in the specification shows a spherical inertial member supported by electric fields, it should be understood that the present invention finds equally useful application where the inertial member has a nonspherical configuration or where the supporting fields are provided by other means. The member could be supported by a magnetic or a fluid field, or even by a ball-bearing arrangement.

Many variations and embodiments are possible within the spirit of this invention. It is therefore understood that the specific embodiment of my invention shown here is for the purpose of illustration only and that my invention is limited only by the scope of the appended claims.

What is claimed is:

1. In an inertial instrument:
   a base;
   a support mounted on said base by gimbal means for relative rotation with said base about a pair of axes;
   a member universally supported by said support for rotation about a spin axis;
   means for detecting relative motion or displacement of said support with respect to said member, said detecting means comprising a pattern of contrasting areas on said member including a radiative surface positioned adjacent to a relatively nonradiative surface at one pole of said member with the line separating the two surfaces passing substantially through said spin axis, and a radiation sensing means positioned on said support adapted to observe the pole region of said member and sense the amount of radiation from said patterned surface, providing output signals indicative of radiation sensed thereby;
   reference means for providing phase reference to said output signals of said radiation sensing means; and demodulating means connected in circuit with said radiation sensing means and said reference means, said demodulating means providing at its output a signal indicative of relative rotational displacement of said member and said support.

2. In an inertial instrument:
   a base;
   a support mounted on said base by gimbal means for relative rotation with said base about a pair of mutally perpendicular axes;
   a spherically shaped member universally supported by said support for rotation about a spin axis;
   means for detecting relative motion or displacement of said support with respect to said member, said detecting means comprising a pattern of contrasting areas on said member including a radiative surface positioned adjacent to a relatively nonradiative surface at one pole of said member with the line separating the two surfaces passing substantially through said spin axis, and a radiation sensing means positioned on said support adapted to observe the pole region of said member and sense the amount of radiation from said patterned surface, providing output signals indicative of radiation sensed thereby;
   reference means for providing phase reference to said output signals of said radiation sensing means; and demodulating means connected in circuit with said radiation sensing means and said reference means, said demodulating means having two outputs, each said output providing a signal indicative of rotational movement about one of said mutually perpendicular axes of said gimbal means.

3. In an inertial instrument:
a base;
a support mounted on said base by gimbal means for relative rotation with said base about a pair of mutually perpendicular axes;
a spherically shaped member universally supported by said support for rotation about a spin axis;
means for detecting relative motion or displacement of said support with respect to said member, said detecting means comprising a pattern of contrasting areas on said member including a reflective surface positioned adjacent to a relatively nonreflective surface at one pole of said member with the line separating the two surfaces passing substantially through said spin axis, a rotor illuminating means mounted on said support to illuminate the pattern on said rotor, and an optical pickoff means positioned on said support adapted to observe the pole region of said member and sense the amount of reflected light from said patterned surface, providing output signals indicative of reflected light sensed thereby;
reference means for providing phase reference to said output signals of said pickoff means; and
demodulating means connected in circuit with said pickoff means and said reference means, said demodulating means having two outputs, each said output providing a signal indicative of rotational movement about one of said mutually perpendicular axes of said gimbal means.

4. In an inertial instrument:
a base;
a support mounted on said base by gimbal means for relative rotation with said base about a pair of mutually perpendicular axes;
a spherically shaped member universally supported by said support for rotation about a spin axis;
means for detecting relative motion or displacement of said support with respect to said member, said detecting means comprising a pattern of contrasting areas on said member including a reflective surface positioned adjacent to a relatively nonreflective surface at one pole of said member with the line separating the two surfaces passing substantially through said spin axis, a rotor illuminating means mounted on said support to illuminate the pattern on said rotor, and an optical pickoff means positioned on said support adapted to observe the pole region of said member and sense the amount of reflected light from said patterned surface, providing output signals indicative of reflected light sensed thereby;
reference means for providing phase reference to said output signals of said pickoff means;
demodulating means connected in circuit with said pickoff means and said reference means, said demodulating means having two outputs, each said output providing a signal indicative of rotational movement about one of said mutually perpendicular axes of said gimbal means;
motor means connected to said gimbal means; and
means for applying said signals from said demodulating means to said motor means, to actuate said motor means and servo said support to maintain said member in substantial register with said support.

5. In an inertial instrument:
a base;
a support mounted on said base by gimbal means for relative rotation with said base about a pair axes;
a member universally supported by said support for rotation about a spin axis;
means for detecting relative motion or displacement of said support with respect to said member, said detecting means comprising a pattern of contrasting areas on said member including a radiative surface positioned adjacent to a relatively nonradiative surface at each pole of said member, the lines separating said two contrasting areas at each pole being portions of a great circle substantially intersecting said spin axis at each pole of said member, the nonradiating surfaces at the two poles lying on opposite sides of said great circle;
two radiation sensing means positioned at diametrically opposite locations on said support, each adapted to observe a pole region of said member and sense the amount of radiation from said patterned surface, providing output signals indicative of radiation sensed thereby;
a summing means connected to each of said radiation sensing means for the purpose of providing an output signal indicative of the sum of the signals appearing at outputs of said radiation sensing means;
reference means for providing phase reference to said output signals of said radiation sensing means; and
demodulating means connected in circuit with said radiation sensing means and said reference means, said demodulating means providing a signal indicative of relative rotational displacement of said member and said support.

6. In an inertial instrument:
a base;
a support mounted on said base by gimbal means for relative rotation with said base about a pair of mutually perpendicular axes;
a spherically shaped member universally supported by said support for rotation about a spin axis;
means for detecting relative motion or displacement of said support with respect to said member, said detecting means comprising a pattern of contrasting areas on said member including a radiative surface positioned adjacent to a relatively nonradiative surface at each pole of said member, the lines separating said two contrasting areas at each pole being portions of a great circle substantially intersecting said spin axis at each pole of said member, the nonradiative surfaces at the two poles lying on opposite sides of said great circle;
two radiation sensing means positioned at diametrically opposite locations on said support, each adapted to observe a pole region of said member and sense the amount of radiation from said patterned surface, providing output signals indicative of radiation sensed thereby;
a summing means connected to each of said radiation sensing means for the purpose of providing an output signal indicative of the sum of the signals appearing at outputs of said radiation sensing means;
reference means for providing phase reference to said output signals of said radiation sensing means;
demodulating means connected in circuit with said radiation sensing means and said reference means, said demodulating means having two outputs, each said output providing a signal indicative of rotational movement about one of said mutually perpendicular axes of said gimbal means;
motor means connected to said gimbal means; and
means for applying said signals from said demodulating means to said motor means to actuate said motor means and servo said support to maintain said member in substantial register with said support.

7. In an inertial instrument:
a base;
a support mounted on said base by gimbal means for relative rotation with said base about a pair of mutually perpendicular axes;
a spherically shaped member universally supported by said support for rotation about a spin axis;

means for detecting relative motion or displacement of said support with respect to said member, said detecting means comprising a pattern of contrasting areas on said member including a reflective surface positioned adjacent to a relatively nonreflective surface at each pole of said member, the lines separating said two contrasting areas at each pole being portions of a great circle substantially intersecting said spin axis at each pole of said member, the nonreflecting surfaces at the two poles lying on opposite sides of said great circle;

a rotor illuminating means mounted on said support to illuminate said pattern at each pole of said member, and two optical pickoff means positioned at diametrically opposite locations on said support, each adapted to observe a pole region of said member and sense the amount of reflected light from said patterned surface, providing output signals indicative of reflected light sensed thereby;

a summing means connected to each of said pickoff means for the purpose of providing an output signal indicative of the sum of the signals appearing at outputs of said pickoff means;

reference means for providing phase reference to said output signals of said pickoff means; and demodulating means connected in circuit with said pickoff means and said reference means, said demodulating means having two outputs, each said output providing a signal indicative of rotational movement about one of said mutually perpendicular axes of said gimbal means.

8: In an inertial instrument:
a base;
a support mounted on said base by gimbal means for relative rotation with said base about a pair of mutually perpendicular axes;
a spherically shaped member universally supported by said support for rotation about a spin axis;
means for detecting relative motion or displacement of said support with respect to said member, said detecting means comprising a pattern of contrasting areas on said member including a reflective surface positioned adjacent to a relatively nonreflective surface at each pole of said member, the lines separating said two contrasting areas at each pole being portions of a great circle substantially intersecting said spin axis at each pole of said member, the nonreflecting surfaces at the two poles lying on opposite sides of said great circle;
a rotor illuminating means mounted on said support to illuminate said pattern at each pole of said member, and two optical pickoff means positioned at diametrically opposite locations on said support, each adapted to observe a pole region of said member and sense the amount of reflected light from said patterned surface, providing output signals indicative of reflected light sensed thereby;
a summing means connected to each of said pickoff means for the purpose of providing an output signal indicative of the sum of the signals appearing at outputs of said pickoff means;
reference means for providing phase reference to said output signals of said pickoff means;
demodulating means connected in circuit with said pickoff means and said reference means, said demodulating means having two outputs, each said output providing a signal indicative of rotational movement about one of said mutually perpendicular axes of said gimbal means; and
motor means connected to said gimbal means; and
means for applying said signals from said demodulating means to said motor means to actuate said motor means and servo said support to maintain said member in substantial register with said support.

9. In an inertial instrument:
a base;
a support mounted on said base by gimbal means for relative rotation with said base about a pair of mutually perpendicular axes;
a spherically shaped member universally supported by said support for rotation about a spin axis;
means for detecting relative motion or displacement of said support with respect to said member, said detecting means comprising a pattern of contrasting areas on said member including a radiative surface positioned adjacent to a relatively nonradiative surface at each pole of said member, the lines separating said two contrasting areas at each pole being portions of a great circle substantially intersecting said spin axis at each pole of said member, the nonradiative surfaces at the two poles lying on opposite sides of said great circle;
two radiation sensing means positioned at diametrically opposite locations on said support, each adapted to observe a pole region of said member and sense the amount of radiation from said patterned surface, providing output signals indicative of radiation sensed thereby;
a subtracting means connected to each of said pickoff means for the purpose of providing an output signal indicative of the difference of the signals appearing at outputs of said radiation sensing means;
a reference means for providing phase reference to said output signals of said radiation sensing means; and
demodulating means connected in circuit with said subtracting means and said reference means, said demodulating means providing at its output a signal indicative of translational movement of said member normal to said spin axis.

10. In an inertial instrument:
a base;
a support mounted on said base by gimbal means for relative rotation with said base about a pair of mutually perpendicular axes;
a spherically shaped member universally supported by said support for rotation about a spin axis;
means for detecting relative motion or displacement of said support with respect to said member, said detecting means comprising a pattern of contrasting areas on said member including a reflective surface positioned adjacent to a relatively nonreflective surface at each pole of said member, the lines separating said two contrasting areas at each pole being portions of a great circle substantially intersecting said spin axis at each pole of said member, the nonreflecting surfaces at the two poles lying on opposite sides of said great circle;
a rotor illuminating means mounted on said support to illuminate said pattern at each pole of said member, and two optical pickoff means positioned at diametrically opposite locations on said support, each adapted to observe a pole region of said member and sense the amount of reflected light from said patterned surface, providing output signals indicative of reflected light sensed thereby;
a subtracting means connected to each of said pickoff means for the purpose of providing an output signal indicative of the difference of the signals appearing at outputs of said pickoff means;
a reference means for providing phase reference to said output signals of said pickoff means; and
demodulating means connected in circuit with said subtracting means and said reference means, said demodulating means providing at its output a signal indicative of translation movement of said member normal to said spin axis.

11. In an inertial instrument:
a base;

a support mounted on said base by gimbal means for relative rotation with said base about a pair of mutually perpendicular axes;

a spherically shaped member universally supported by said support for rotation about a spin axis;

means for detecting relative motion or displacement of said support with respect to said member, said detecting means comprising a pattern of contrasting areas on said member including a radiative surface positioned adjacent to a relatively nonradiative surface at each pole of said member, the lines separating said two contrasting areas at each pole being portions of a great circle substantially intersecting said spin axis at each pole of said member, the nonradiative surfaces at the two poles lying on opposite sides of said great circle;

two radiation sensing means positioned at diametrically opposite locations on said support, each adapted to observe a pole region of said member and sense the amount of radiation from said patterned surface, providing output signals indicative of radiation sensed thereby;

a summing means connected to each of said radiation sensing means for the purpose of providing an output signal indicative of the sum of the signals appearing at outputs of said radiation sensing means;

a subtracting means connected to each of said radiation sensing means for the purpose of providing an output signal indicative of the difference of the signals appearing at outputs of said radiation sensing means;

a reference means for providing phase reference to said output signals of said radiation sensing means;

a first demodulating means connected in circuit with said subtracting means and said reference means, said first demodulating means providing at its output a signal indicative of translational movement of said member normal to said spin axis; and a second demodulating means connected in circuit with said summing means and said reference means, said demodulating means providing at its output a signal indicative of relative rotational displacement of said member and said support.

12. In an inertial instrument:

a base;

a support mounted on said base by gimbal means for relative rotation with said base about a pair of mutually perpendicular axes;

a spherically shaped member universally supported by said support for rotation about a spin axis;

means for detecting relative motion or displacement of said support with respect to said member, said detecting means comprising a pattern of contrasting areas on said member including a reflective surface positioned adjacent to a relatively nonreflective surface at each pole of said member, the lines separating said two contrasting areas at each pole being portions of a great circle substantially intersecting said spin axis at each pole of said member, the nonreflecting surfaces at the two poles lying on opposite sides of said great circle;

a rotor illuminating means mounted on said support to illuminate said pattern at each pole of said member, and two optical pickoff means positioned at diametrically opposite locations on said support, each adapted to observe a pole region of said member and sense the amount of reflected light from said patterned surface, providing output signals indicative of reflected light sensed thereby;

a summing means connected to each of said pickoff means for the purpose of providing an output signal indicative of the sum of the signals appearing at outputs of said pickoff means;

a subtracting means connected to each of said pickoff means for the purpose of providing an output signal indicative of the difference of the signals appearing at outputs of said pickoff means;

a reference means for providing phase reference to said output signals of said pickoff means;

a first demodulating means connected in circuit with said subtracting means and said reference means, said first demodulating means providing at its output a signal indicative of translational movement of said member normal to said spin axis; and a second demodulating means connected in circuit with said summing means and said reference means, said demodulating means providing at its output a signal indicative of relative rotational displacement of said member and said support.

13. In an inertial instrument:

a base;

a support mounted on said base by gimbal means for relative rotation with said base about a pair of mutually perpendicular axes;

a spherically shaped member universally supported by said support for rotation about a spin axis;

means for detecting relative motion or displacement of said support with respect to said member, said detecting means comprising a pattern of contrasting areas on said member including a radiative surface positioned adjacent to a relatively nonradiative surface at each pole of said member, the lines separating said two contrasting areas at each pole being portions of a great circle substantially intersecting said spin axis at each pole of said member, the nonradiative surfaces at the two poles lying on opposite sides of said great circle;

two radiation sensing means positioned at diametrically opposite locations on said support, each adapted to observe a pole region of said member and sense the amount of radiation from said pattern surface, providing output signals indicative of radiation sensed thereby;

a summing means connected to each of said radiation sensing means for the purpose of providing an output signal indicative of the sum of the signals appearing at outputs of said radiation sensing means;

a subtracting means connected to each of said radiation sensing means for the purpose of providing an output signal indicative of the different of the signals appearing at outputs of said radiation sensing means;

a reference means for providing phase reference to said output signals of said radiation sensing means;

a first demodulating means connected in circuit with said subtracting means and said reference means, said first demodulating means providing at its output a signal indicative of translational movement of said member normal to said spin axis;

a second demodulating means connected in circuit with said summing means and said reference means, said demodulating means providing at its output a signal indicative of relative rotational displacement of said member and said support;

motor means connected to said gimbal means; and means for applying said signals from said second demodulating means to said motor means, to actuate said motor means and servo said support to maintain said member in substantial register with said support.

14. In an inertial instrument:

a base;

a support mounted on said base by gimbal means for relative rotation with said base about a pair of mutually perpendicular axes;

a spherically shaped member universally supported by said support for rotation about a spin axis;

means for detecting relative motion or displacement of said support with respect to said member, said detecting means comprising a pattern of contrasting areas on said member including a reflective surface positioned adjacent to a relatively nonreflective surface at each pole of said member, the lines separating said two contrasting areas at each pole being portions of a great circle substantially intersecting said spin axis at each pole of said member, the nonreflecting surfaces at the two poles lying on opposite sides of said great circle;

a rotor illuminating means mounted on said support to illuminate said pattern at each pole of said member, and two optical pickoff means positioned at diametrically opposite locations on said support, each adapted to observe a pole region of said member and sense the amount of reflected light from said patterned surface, providing output signals indicative of reflected light sensed thereby;

a summing means connected to each of said pickoff means for the purpose of providing an output signal indicative of the sum of the signals appearing at outputs of said pickoff means;

a subtracting means connected to each of said pickoff means for the purpose of providing an output signal indicative of the difference of the signals appearing at outputs of said pickoff means;

a reference means for providing phase reference to said output signals of said pickoff means;

a first demodulating means connected in circuit with said subtracting means and said reference means, said first demodulating means providing at its output a signal indicative of translational movement of said member normal to said spin axis;

a second demodulating means connected in circuit with said summing means and said reference means, said demodulating means providing at its output a signal indicative of relative rotational displacement of said member and said support;

motor means connected to said gimbal means; and means for applying said signals from said second demodulating means to said motor means, to actuate said motor means and servo said support to maintain said member in substantial register with said support.

References Cited by the Examiner

UNITED STATES PATENTS

| | | | |
|---|---|---|---|
| 1,972,882 | 9/1934 | Gillmor | 33—226 |
| 2,867,393 | 1/1959 | Burley | 250—203X |
| 2,942,479 | 6/1960 | Hollmann | 74—5.6 |
| 2,959,060 | 11/1960 | Kunz | 74—5.6 |

RALPH G. NILSON, *Primary Examiner.*

MAYNARD R. WILBUR, *Examiner.*

W. STOLWEIN, *Assistant Examiner.*